United States Patent
Van Os et al.

(10) Patent No.: US 9,059,957 B2
(45) Date of Patent: Jun. 16, 2015

(54) COMPLEX HANDLING OF CONDITIONAL MESSAGES

(71) Applicants: Marcel Van Os, San Francisco, CA (US); May-Li Khoe, San Francisco, CA (US)

(72) Inventors: Marcel Van Os, San Francisco, CA (US); May-Li Khoe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 13/600,016

(22) Filed: Sep. 24, 2012

(65) Prior Publication Data

US 2014/0089417 A1    Mar. 27, 2014

(51) Int. Cl.
 *G06F 15/16* (2006.01)
 *H04L 12/58* (2006.01)

(52) U.S. Cl.
 CPC ............... *H04L 51/24* (2013.01); *H04L 51/00* (2013.01)

(58) Field of Classification Search
 CPC .............................. H04L 51/00; H04L 51/24
 USPC ................. 709/204–207, 217–219, 227–229; 715/740–741
 See application file for complete search history.

(56) References Cited

U.S. PATENT DOCUMENTS

| | | | |
|---|---|---|---|
| 6,259,381 B1 | 7/2001 | Small | |
| 7,464,007 B2 * | 12/2008 | Reitman et al. | 703/2 |
| 8,068,856 B2 | 11/2011 | Kwon | |
| 8,233,487 B2 * | 7/2012 | Kusama et al. | 709/228 |
| 8,483,772 B2 * | 7/2013 | Naftolin | 715/741 |
| 8,549,085 B2 * | 10/2013 | Lee et al. | 709/206 |
| 2008/0268895 A1 | 10/2008 | Foxenland | |
| 2010/0161736 A1 * | 6/2010 | Picknelly | 709/206 |
| 2011/0196756 A1 | 8/2011 | Moosavi et al. | |
| 2014/0365569 A1 * | 12/2014 | Vyrros et al. | 709/204 |

FOREIGN PATENT DOCUMENTS

JP    2007-249372 A    9/2007

* cited by examiner

*Primary Examiner* — Bharat N Barot
(74) *Attorney, Agent, or Firm* — Kilpatrick Townsend & Stockton LLP

(57) ABSTRACT

System, methods, and apparatuses are provided for outputting a notification of a conditional communication (e.g., a message) based on one or more conditions. The output can be controlled by a receiver's device or by a server communicably coupled with the receiver's device, on which a set of applications are loaded. For example, a filter can determine whether a communication has an associated condition. The condition can require specific values of a variable property associated with the receiver's device. A selector module can determine a subset of application(s) that are used to obtain the variable property. When the condition is satisfied, a notification of the communication can be output.

26 Claims, 6 Drawing Sheets

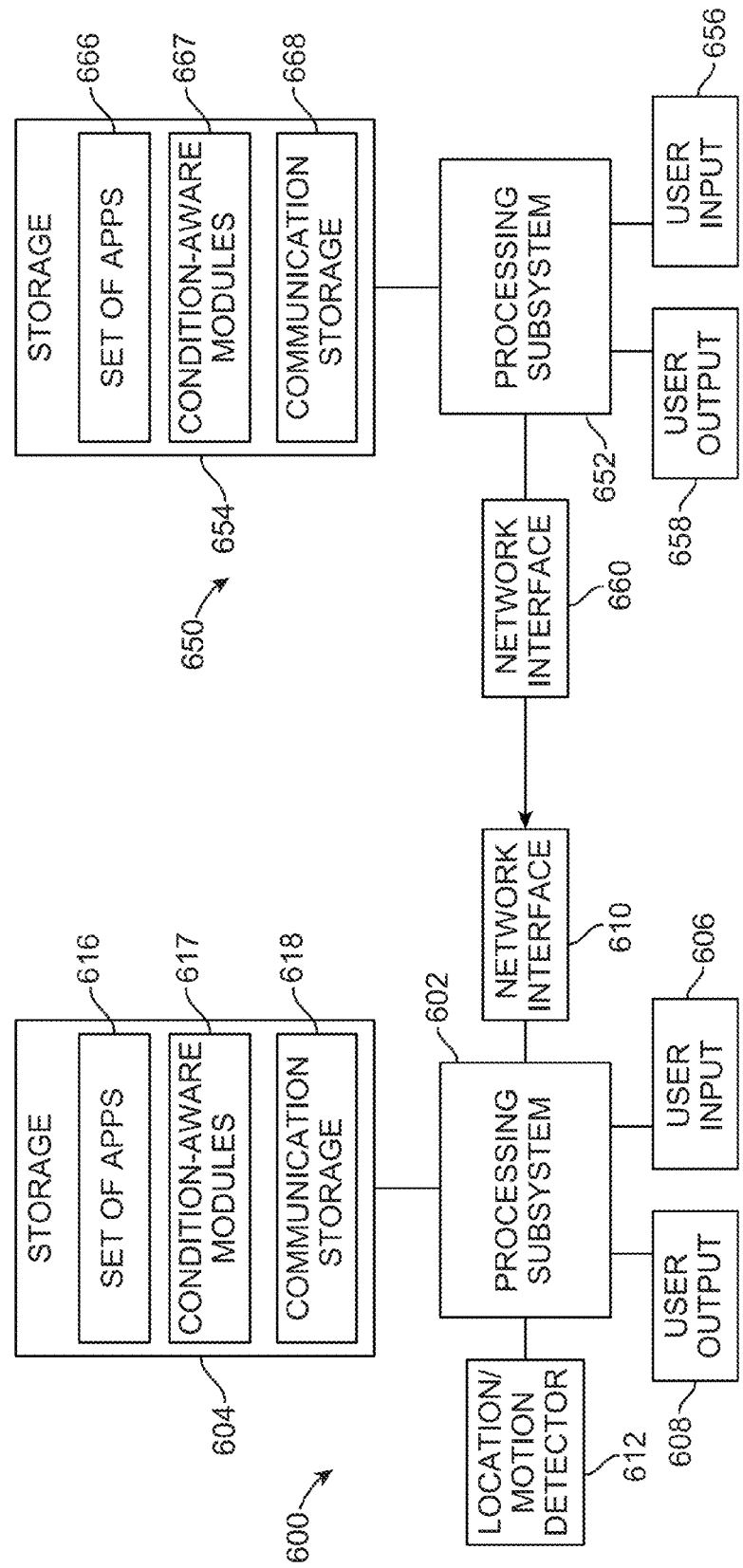

COMPLEX HANDLING OF CONDITIONAL MESSAGES

BACKGROUND

The present disclosure generally relates to conditional messages or other communications, and more specifically to handling messages with various types of conditions.

Typically, when one sends a message (e.g., a text message) to another person's phone, the message is immediately displayed after the other person's phone receives the message. However, there are times that it is desirable for a message to not be displayed immediately. For example, the sender of the message may not want the message to be displayed until the other person is at a geographical location, such as a grocery store. U.S. Patent Publication 2008/0268895 and U.S. Pat. No. 8,068,856 describe using geographic location. Such conditions are easy to implement using a geo-fence as the single and only possible condition.

While such methods do provide a convenient way of specifying when a message will be displayed, such methods are focused on geographic location. Thus, a sender is limited in how he/she can specify a condition for when a message is to be displayed. Besides only focusing on geographic location, current methods do not provide a framework for enabling multiple types of conditions, even if such other conditions may have been known.

It is therefore desirable to provide systems, methods, and apparatuses for handling a variety of different types of conditions, which may use a variety of different properties associated with the receiving device to determine when a communication is provided.

BRIEF SUMMARY

Embodiments can provide system, methods, and apparatuses for outputting a notification of a conditional communication (e.g., a message) based on one or more conditions. The output can be controlled by a receiver's device or by a server communicably coupled with the receiver's device, on which a set of applications are loaded. For example, a filter can determine whether a communication has an associated condition. The condition can require specific values of a variable property associated with the receiver's device. A selector can determine a subset of application(s) that are used to obtain the variable property. When the condition is satisfied, a notification of the communication can be output.

According to one embodiment, a method provides a notification of a conditional communication. A conditional communication that has a communication part is received. The conditional communication is determined to have one or more associated conditions, including a first condition. A variable property that is associated with an electronic device and that is used to evaluate the first condition is identified. A set of applications are installed on the electronic device. A subset of one or more applications are selected from the set for obtaining the variable property associated with the electronic device. The one or more applications in the subset are dependent on the identified variable property. A value of the variable property is obtained at one or more times using the subset of applications. Whether the one or more conditions are satisfied is determined, including determining whether the variable property satisfies the first condition. When the one or more conditions are satisfied, a notification of the communication part is output.

According to another embodiment, a method provides a notification of a conditional communication. A conditional communication is received. The conditional communication is determined to have one or more associated conditions, including a first condition. A variable property that is associated with at least one electronic device and that is used to evaluate the first condition is identified. The first condition is translated to a plurality of logical expressions. Each logical expression is assigned to a different notification of the conditional communication, where different notifications have differ content. One or more values of the variable property are obtained. A first logical expression of the plurality of logical expressions is determined to be satisfied by one of the values. A first notification is identified as being assigned to the first logical expression. The first notification is output when the one or more associated conditions are satisfied.

According to another embodiment, a method provides a notification of a conditional communication and the conditional communication. A conditional communication that has a communication part is received. A computer system determines that the conditional communication has one or more associated conditions, including a first condition. The computer system identifies a variable property that is associated with a first electronic device and that is used to evaluate the first condition. The computer system obtains a value of the variable property at one or more times. The computer system determines whether the one or more conditions are satisfied, including determining whether the variable property satisfies the first condition. The communication part is transmitted to a first application so that the communication part is viewable by a user regardless of any of the one or more associated conditions. When the one or more conditions are satisfied, a notification of the communication part is output, where the notification is an alert that the conditional communication has been received and is awaiting review by the user. In one embodiment, the first application is executing on the first electronic device. In one embodiment, the first application is executing on a second electronic device that is different from the first electronic device.

According to another embodiment, a method providing a notification of a conditional communication to a subset of electronic devices that are associated with a first user. A conditional communication that has a communication part and that is intended for a first user is received. A server determines that the conditional communication has one or more associated conditions, including a first condition. The server identifies a variable property that is associated with at least a first of the electronic devices and that is used to evaluate the first condition. The server obtains a value of the variable property at one or more times. The server determines whether the one or more conditions are satisfied, including determining whether the variable property satisfies the first condition. The server determines a subset of one or more of the electronic devices based on one or more capabilities of the electronic devices. When the one or more conditions are satisfied, a notification of the communication part is output to the subset of one or more of the electronic devices.

According to another embodiment, a method provides a notification of a conditional communication. A conditional communication that has a communication part is received. A computer system determines that the conditional communication has one or more associated conditions, including a first condition. The computer system identifies a variable property that is associated with an electronic device and that is used to evaluate the first condition. The computer system obtains a value of the variable property at one or more times in response to a trigger, where the trigger is a signal received at an input of the electronic device from a user or from another device. The computer system determines whether the one or more conditions are satisfied, including determining whether the variable property satisfies the first condition. When the one or more conditions are satisfied, output a notification of the communication part.

Other embodiments are directed to systems, electronic devices, and computer readable media associated with methods described herein.

A better understanding of the nature and advantages of the present invention may be gained with reference to the following detailed description and the accompanying drawings.

BRIEF DESCRIPTION OF THE DRAWINGS

FIG. 6A is a simplified block diagram of an implementation of a receiver's device 600 according to an embodiment of the present invention. FIG. 6B is a simplified block diagram of an implementation of a server device 650 according to an embodiment of the present invention.

DEFINITIONS

Figure 1:
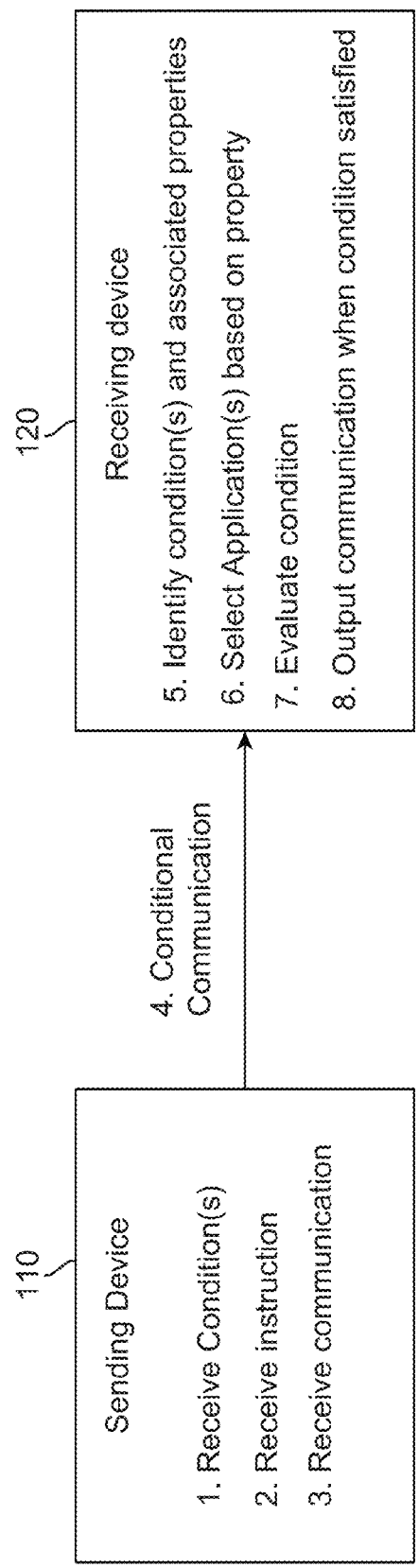
FIG. 1 shows a sending device 110 sending a conditional communication (e.g., message) to a receiving device 120 according to embodiments of the present invention.

The term "applications" (apps) includes functions or subroutines, as well as higher level applications that call functions and subroutines. Such higher level applications can be purchased to run on various platforms (e.g., a desktop computer, tablet, or smartphone) and may call functions or subroutines that are shared among applications running on a particular device.

A "conditional communication" is a communication with one or more associated conditions. A conditional communication can also have an instruction part and a communication part, also just called a communication. Examples of the instruction part include commands like "tell" and "display". The instruction part can be implicit and a default can be used. The communication part can specify content or just a reference to the content to be provided as part of the communication. As an example, a "communication" can be a message whose text is specified by a sender of the conditional communication; formatting of the text could also be specified. As another example, a communication can refer to audio or visual content (or other data) to be output. For instance, the content can be a set of photos that are already on the receiving device A "variable property" is associated with a device, and include specific properties of the device as well as values that depend on specific properties of the device. For example, a location is a specific property of a device. Data stored in a device can also provide a specific property, such as a calendar of events stored in the device. The weather at the location of a phone is a variable property that depends on a specific property of the device.

A "logical expression" is any function that can provide a positive result for a signal to be sent, e.g., an output signal. An example is an IF statement, which can return a value of True. The result of True can then trigger a signal indicating that a notification should be output.

DETAILED DESCRIPTION

Typically, when one sends a message (e.g., a text message) to a receiver's phone, the message is immediately displayed after the receiver's phone receives the message. Some methods can use the location of the receiver's phone to determine when to send the message. However, such methods do not provide for flexibility in the types of conditions that the sender can specify to determine when and how a message or other communication can be output based on various variable properties associated with the receiver's device.

Embodiments can allow a person (sender) to send a conditional communication to another person (receiver), where the condition(s) can implicate various applications on the receiver's device, or even multiple devices of the receiver. The condition is not just location, but can involve various properties that can be determined from the receiver's device using the implicated application(s). Some general concepts and use examples are provided first, which is followed by embodiments with logic on the receiver's device or a server, along with descriptions of methods and other details.

I. Introduction

FIG. 1 shows a sending device 110 sending a conditional communication (e.g., message) to a receiving device 120 according to embodiments of the present invention. As a basic example, embodiments allow a sender to select one or more conditions to attach to a message (a basic example of a communication), which is to be output to a receiver by receiving device (120). Sending device 110 and receiving device 120 can be various electronic devices, such as desktop computer, laptop computers, tablets, or smartphones. Example steps in the process are now explained. As with other methods, the steps can be performed in various orders, and all steps may not be required.

In step 1, the sender can provide one or more conditions. For example, the sender can select the condition(s) from a list or provide the condition(s) by speaking or entering text. The latter can require additional analysis of the condition, since the condition is not from a predetermined list. Some examples of conditions are as follows, with the identification of at least one implicated application: (1) "when out of a meeting"—calendar; (2) "when weather is nice"; weather application; (3) "when she wakes up" or "when alarm goes off"—alarm; (4) "when it is 8 am"—clock set at location of receiving device 120. The implicated application is the application on receiving device 120 that is used to determine a variable property, such as time when no meeting is scheduled on receiving device 120 or local weather where receiving device 120 is located. In one embodiment, the sender can specify a particular application to be used.

In step 2, the sender can provide an instruction for outputting the communication. For example, the sender can use commands like "tell her" and "display". These commands can be used to determine how the communication is displayed. Such commands are optional.

In step 3, the sender specifies the content of the communication or a reference to the content. For example, the sender can type of say "I love you" as a message. As another example, the sender can provide a picture that is to be displayed, or reference pictures stored on receiving device 120 (e.g. by specifying pictures including the sender and the receiver). Sending such a complex reference does require the receiving device to know how to resolve the reference.

In step 4, the conditional communication is sent. For example, the communication can be sent as a conditional text message via short message (SMS). The message can be sent via a server that performs an analysis of the conditions and the communication. Thus, receiving device 120 can be a server or a device of the receiver.

In step 5, receiving device 120 identifies the conditions in the conditional communication. As an initial analysis, receiving device 120 can determine whether the communication has any conditions. Once a condition is determined, receiving device 120 can determine one or more variable properties used to evaluate whether the condition is satisfied. Examples of variable properties are provided herein, and a few are time when available, weather an action has occurred (e.g., an insulin shot as determined by a diabetes application), and presence of a person at a device. A "presence" can be determined, for example, from logging in, a proximity of a phone to another machine, a camera (which may be on a desktop or laptop), near field communication (NFC) tagging, etc.

In step 6, receiving device 120 selects the applications used to obtain the identified variable properties. For example, the implicated application as mentioned above for step 1 can be identified. Example application include calendar, alarm, weather, clock, location, music, video, and presence. A condition could implicate more than one application, for example, if more than one variable property is involved.

In step 7, receiving device 120 evaluates the condition by obtaining a value of the variable property using the selected application(s). When the condition is satisfied is determined by receiving device 120. Thus, a person's phone may receive a message, but the person may only receive the message when the phone determines that the condition is met. The conditional message also could be sent to oneself, where the sending and receiving device are the same.

In step 8, receiving device 120 outputs the communication when the condition(s) are satisfied. The communication can, for example, be output to a person via audio or visually. In one embodiment, the communication can be provided electronically (e.g., wirelessly) to another device. If the condition is not satisfied for a long time, the communication can be canceled and deleted, e.g., as determined by a default setting, a sender setting, and/or a receiver setting.

An example of a conditional communication is when the sender says "tell her I love her when it stops raining" The condition is "when it stops raining". The instruction is "tell her", which conveys that the communication will involve words. Whether the words will be presented by audio or on a screen can be determined by settings at the receiving device. The condition is determined by the receiving device. Since the weather is dependent on the location of the receiver, the variable properties can be location and weather. For example, if the sender is traveling in Australia, the condition of stop raining is determined based on location of receiver's phone, e.g., which may be in San Francisco.

Another example of a condition is when two or more people are in proximity to each other, which may be determined based on locations of the respective phones. Other properties of other phones can be used besides location. When properties of multiple devices are implicated in the condition, an embodiment can use a server in the network (and thus in communication with the devices) to determine variable properties and determine when the condition is satisfied.

A sender can specify combination of conditions for a conditional communication. For example, time and location can be specified, as exemplified by "remind my husband to take the turkey out of the freezer when he is at home this evening." With this example, the husband will get the message when he gets home, and thus will remember to do it right then, as opposed to getting the message at an earlier time.

Another example of multiple conditions is when it is sunny (possibly along with temperature) on a Saturday in the morning, a message can be output to a group of friends about driving antique cars along the coast. Here, the variable properties can be day and time (morning can be a defined time range), which could vary if one of the friends happened to be in a different time zone. A negative condition can also be provided, e.g., provide the message as long as the receiver is not at work. If one of the friends is at work, then that person would not get the message and get jealous. Thus, some of the receivers may get the message and some may not, depending on the values of the variable properties specific to the receiver.

As mentioned above, embodiments can allow many different types of conditions, not just location. Embodiments provide a general framework for allowing conditions that involve many different applications.

II. Diagram

Figure 2:
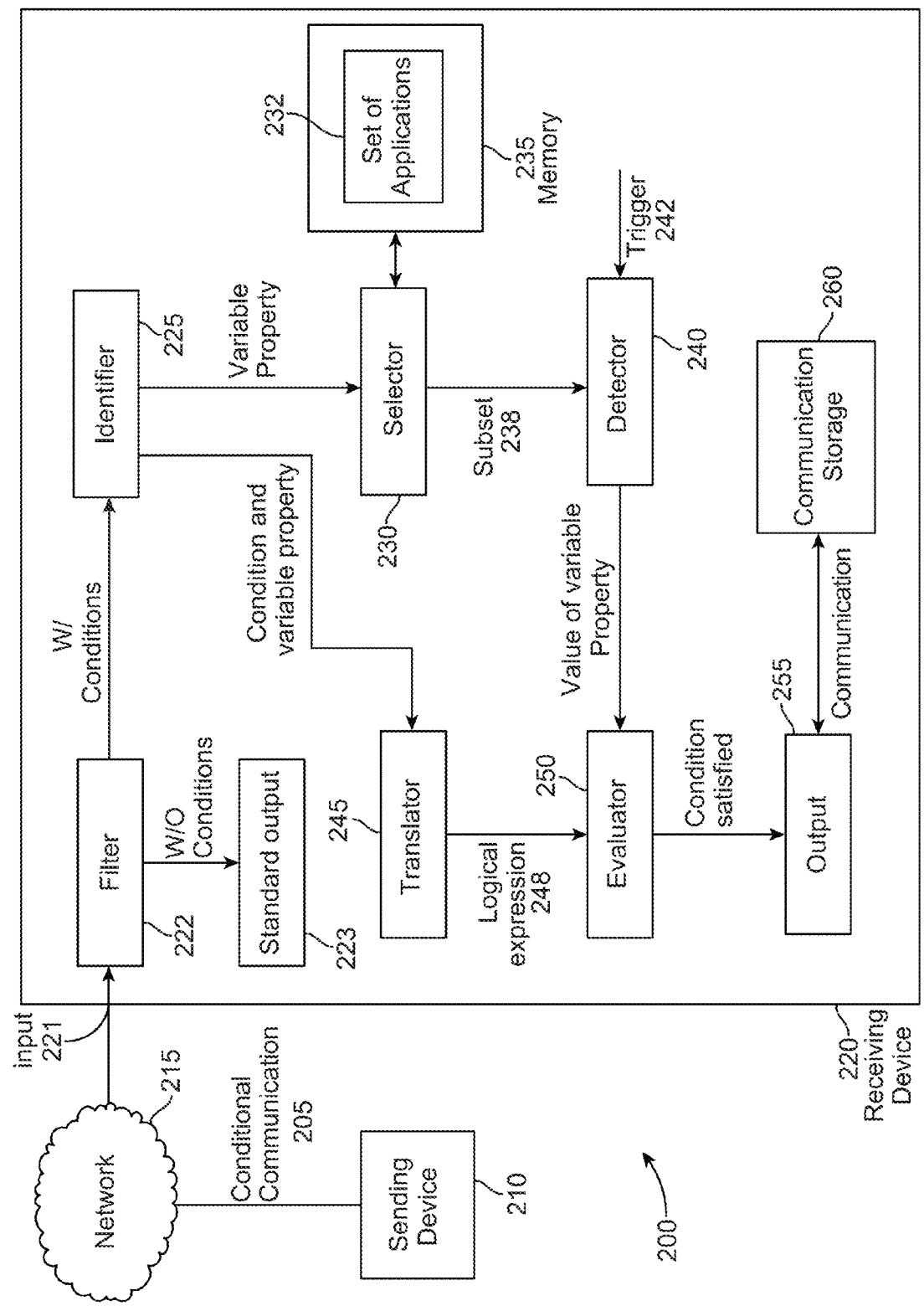
FIG. 2 shows a block diagram of a system 200 involving a receiving device 220 configured to analyze and evaluate conditional communications according to embodiments of the present invention.

FIG. 2 shows a block diagram of a system 200 involving a receiving device 220 configured to analyze and evaluate conditional communications according to embodiments of the present invention. Sending device 210 can receive input from a sender to define a conditional communication 205, which can be sent through a network 215 to receiving device 220 via input 321 (e.g., a network interface).

A. Sending Device

As mentioned above, the sender can specify various parts of a conditional communication, such as the condition, an instruction, and the communication. The sender input can be provided at sending device 210, which may be executing an application that is conditional-aware, or is in communication with a server that is executing the application. The conditional communication can be set up for the sending device and sent to the receiving device as part of one procedure. This might be the case where the condition is dependent on properties of both devices (e.g., a mutual proximity to each other). Additionally, the sender may want to set up a same conditional message for himself and for another person, which can be done as part of one process.

In one embodiment, the conditional-aware application can provide one or more drop down menu(s) (which may have a hierarchal structure). The sender can select the conditions from the menus. For example, a user can select a category labeled weather, and then select the type of weather required for the condition. The menu can be navigated by voice, motion, pointing device (e.g., a mouse), or other input. For example, a sender can say "send conditional communication" or "send communication with condition(s)" to start a conditional communication, which can cause the device to output different categories and conditions for selection.

In another embodiment, the sender can specify the conditions ad hoc, without a specific menu to be navigated. The sending device could use the input to suggest a condition that fits within parameters set by the application. For example, a sender could say "when it is nice outside" and the condition-aware application could suggest "when the weather is sunny" as an approved alternative, or provide several options.

The sender could be prompted for content, or the application can allow for a stream of words, and the content (our reference to content) can be parsed out. The sender can also provide a command word to start input of the communication part. The sender can also drag and drop content to be sent as the communication, where the content can be sent as a link or the content can be sent itself.

In one embodiment, the condition-aware application can be a function that is built into various application or that various applications can call, thereby providing a uniform interface across different applications. In other embodiments, difference applications can have self-contained conditional code, each with a different interface.

B. Receiving Device

Receiving device 220 is condition-aware and is shown with different modules inside. The different modules can be hardwired circuitry or software modules that run on a processor of receiving device 220. The conditional communication can be received at an input 221. As examples, the input can be a network interface or peer-peer interface, such as Bluetooth.

Upon receiving any communication or possibly just communications received via a particular channel, filter 222 of receiving device 220 can check whether the communication contains a condition, and thus whether the communication is a conditional communication. Filter 222 can determine whether a communication includes a condition in a variety of ways. The communication can include a keyword, e.g., "condition", which indicates the communication is a conditional communication. Alternatively, just the words of the communication can be analyzed (e.g., conditional words like "when" or "if" can be used to identify a communication as being conditional). Other data, such as bits or variables, could also be used.

If a condition is not identified, then the communication can be processed via a standard output 223, which can simply include displaying the message via a message application. If the communication is identified as a conditional communication, then the condition(s) can be sent to identifier 225. The communication part itself (potentially along with the instruction for how to provide the communication) can be stored, e.g., in communication storage 260.

Identifier 225 can analyze a condition (and any metadata representing the condition, e.g., an ID) to determine one or more variable properties needed to evaluate the condition. A selector 230 receives a variable property from identifier 225 and selects a subset 238 of applications that are used to determine a value of the variable property. Subset 238 can be selected from a set of applications 232 that are loaded onto receiving device 220, and are shown stored in memory 235. Any memory mentioned herein can be a separate circuit or a different logical part of a same circuit specifying a different storage location.

A detector 240 can use subset 238 of applications to determine a value of the variable property. The value can be determined in response to a trigger 242, which indicates that the variable property should be detected at the time of trigger 242. Note that this process can be repeated for several variable properties, each of which may be implicated by a same condition or different conditions of a same communication, or even different communications. Detector 240 can send the measured value to evaluator 250.

A translator 245 can receive the condition and variable property to determine a logical expression 248, which involves the value determined by the detector 240. The logical expression 248 is sent to evaluator 250 to determine whether the condition is satisfied based on the measured value of the variable property. If the evaluation of the logical expression indicates that the condition is satisfied, a condition satisfied signal can be provided to an output module 255. Output 255 can retrieve the communication (as content or a reference) from communications storage 260, and output the communication. The communication can be output in a particular manner and to a particular device as specified in the instruction part of the conditional communication. In one embodiment, a notification of the communication is output, and the receiver can then obtain the content of the communication later.

1. Identifier

Identifier 225 can identify a variable property associated with a condition in a variety of ways. For example, a mapping of a condition to a variable property can be stored at an accessible location (which may be local or remote). When a specific condition is identified, one or more corresponding properties can then be retrieved. In one embodiment, the specific condition can include an ID. The ID could be included by the sending device into the conditional communication based on the condition selected by the sender. If the conditional communication included multiple conditions, then a set of IDs could be included, one for each condition. Filter 22 can use such an ID to determine that a condition exists, and identifier 225 can use the ID to access a data structure (e.g., a table) to retrieve the corresponding variable property by matching the ID to an entry in the data structure. The developer of a condition-aware application can specify the IDs can provide access to the data structure for retrieving the variable property.

As an example, if the sender selects a condition from a list, each item on a list could be associated with a particular variable property. An ID (which could be name) specifying the condition or the variable property can be sent as part of the conditional communication. If both devices use a same list, the ID can then be mapped to the correct variable property that corresponds to the condition. In one implementation, the sender can create a linkage (e.g., as a table) between a condition and a variable property and send that linkage along with the conditional communication.

2. Selector

Selector 230 can receive a name or other identifier of a variable property. In one embodiment, a lookup table can be used to cross-reference the identifier with an application. The applications that are possible could be limited to a specific set, and not every application on the receiving device. Thus, there might be a set of condition-aware applications, and the set 232 of applications in the lookup table can be limited to such applications. The implicated application could be used by other applications, and thus be a function or subroutine, and can be re-used among higher level applications. In one implementation, the receiver can select which applications are to be used to obtain which variable properties, thus effectively creating a table, which may be suitable when multiple applications could be used to obtain the same variable property. Selector 232 can be part of a specific application or be part of system software, as can any of the other modules.

In another embodiment, selector 230 can determine which applications are associated with which properties (e.g., as identified by name), and not need a lookup table. For example, a summary of an application can specify functions of the application, and that summary can be searched to identify that a particular function exists to obtain a property. Even without a summary, the device can determine a variable, which may be defined in code or named within the executable code of the application. Such a variable could be determined as an application is executed. The correspondence between a variable and an application can be stored to create a data structure (e.g., a lookup table) by selector 230 or other module of the receiving device for future mappings between property and name.

In another embodiment, the sender can encapsulate a name (or other identifier) of the implicated application with the conditional communication. The identifier can be used to access a data structure to select a corresponding application as part of subset 238, which may be just one application. The conditional communication can include multiple identifiers of applications or variable properties, which can result in multiple application being added to subset 238. If the receiving device cannot identify the application (e.g., the receiving device does not have the application loaded), an error signal can be generated and sent to the sender.

3. Detector

In various embodiments, detector 240 can include a hardware detection device, such as a global positioning system (GPS) detector, or be a software detector that requests one of the applications of subset 238 to return a value (e.g., where the variable is stored in receiving device 220 or is obtained from a network location, such as a website or other server). Different detectors can be used for different variable properties. For example, detector 240 can be a particular function of an application in subset 238. A master detector module can coordinate all of the respective detectors, and detector 240 can represent such a master detector.

As mentioned above, detector 240 can determine a value of a variable property (e.g. location, calendar time) and send the value to the evaluator 250. Detector 240 can invoke subset 238 of application to return the value of the variable property. For example, detector 240 can request one application to get a current location of the device, and then use the current location to obtain the weather at the current location, where the current weather is the value to be sent to evaluator 250.

An application of subset 238 can also request a property of another device, e.g., when variable properties from other devices can also be used in determining when a condition is met. For instance, a logical expression could involve when one hour is free on the calendars of two devices. One variable property involves the calendar of one device, and the other variable property involves the calendar of the other device. These values can be collected by different calls to a same application or calls to different applications. As stated herein, receiving device can be a server or the device of the intended receiver. A server can send out separate requests to respective devices to obtain the current values of the variable properties.

4. Trigger

Trigger 242 causes detector 240 to measure the value of a particular property. For example, when trigger 242 is received, detector 240 can invoke hardware or an application to return a current value for a variable property. Trigger 242 can include an identifier specifying which variable property should be obtained in response. Trigger 242 could also cause multiple variable properties to be detected, and thus include multiple identifiers, or simply not include any identifiers when all variable properties of active conditional communications are to be detected. Detector 240 can maintain a list of active variable properties.

Trigger 242 can vary for different variable properties. For example, trigger 242 can be a periodic signal (i.e., every 10 minutes or every day) that identifies a particular variable property to be detected. The generation of such a periodic signal can be set when a particular variable property is identified by identifier 225. A system function tied to a clock can be used to generate the periodic signals. The receiving user can set parameters for the generation of such periodic signals, e.g., the time frame of how often the signal is generated. A longer period can save batter life.

As another example, trigger 242 can be generated in response to an event, such as an action by a user of receiving device 220 or receiving of a signal from an internal or external application. For instance, a trigger can be generated when the receiving user uses an application to check in at a location, which can prompt a trigger to be sent to detector 240 to detect the current location for use in evaluating conditions. A calendar function can provide a trigger when an event ends. This trigger could go to detector 240, which then can determine any other properties, which might be implicated.

In one embodiment, the trigger could actually provide the value of the property, e.g., when trigger received then value is True. For example, if a user scans a ticket, then the entry variable (e.g., if condition is "when person enters the theater") becomes True, and a message could be sent, as determined by evaluator 250. Thus, detector 240 can wait for the trigger from a particular application to determine a value for the property. And, once evaluator 250 receives a new value, it can then evaluate any implicated logical expressions.

Maintenance of when triggers are generated can help to save battery life. The time for generating a trigger can be governed by when there is a likely chance of satisfying a condition, e.g., when the variable property is known to have changed, as when checking in at a location. The user can specify how often and when a trigger is generated, e.g., via a setting menu. The settings can be broad (low battery impact or high battery impact), where specific parameters can be associated with each setting.

Even if a user has many conditional messages that implicate a same property (e.g., location), the property can be checked for all conditions that use the property. The resulting value of the property can be used in any of the logical expressions for the various conditions. Thus, each condition does not need to spawn a separate measurement of the variable property, which would cause more checking when more conditional messages are received, and thus drain down a battery and use up more processing power.

In one embodiment, the user can also specify which apps and/or which devices can cause a trigger to be generated. For example, a user can add an insulin measuring or injection device. A measurement device can communicate with receiving device 220 (e.g., via Bluetooth) and communication from the measurement device can effectively act as a trigger. Such a measurement device could send an indication that an insulin level has been measured to receiving device 220, which can cause a trigger to be generated. In this example, the insulin measurement trigger itself can cause detector 240 to determine a change in the variable to True. The app that interacts with the measurement device can be used to determine when the measurement has occurred. An example conditional message in this case could include the condition of "send a message once insulin is taken".

5. Translator

Translator 245 receives a condition and possibly the one or more associated variable properties (more than one condition could also be received). In various aspects, the condition is a set of words (e.g., "when the weather is nice") or an ID corresponding to such words (e.g., when the sender has chosen from a predetermined list of conditions). In both cases, the condition is translated to a logical expression that a module (e.g., evaluator 250) can evaluate to determine if the condition is satisfied. For an ID, a developer can predetermine a logical expression for each allowance condition selected from a list. The logical expression could be generic to the specific variable property used, and the current value simply inserted when evaluation is done. An identifier designating the variable property can be sent to translator 245 so that the proper variable is inserted.

When translator 245 receives just words, an engine can translate the words into a logical expression. In one embodiment, the receiving user can set how a condition is translated. For example, the condition "when she is at her desk" can be defined to be a proximity of her laptop and her phone (a system-defined default could also be used). In one embodiment, the condition is optionally normalized (e.g., unneeded prepositions are removed), and then a hash function can be applied to the condition. The resulting hash can then be cross-referenced with a table to identify a predetermined logical expression.

In another embodiment, keywords in the condition can be identified, such as "when" or "if". Such conditional language can be mapped to a logical IF statement. Next, the variable property can be identified (by words or by identifier), and a corresponding variable is placed into the IF statement at a location where a current value of the property is inserted for evaluation. For example, a variable of the distance between the phone and laptop can be placed in the equation as $|L\_phone-L\_laptop|$, where two properties are implicated. The desired property can be identified, e.g., the default or user setting can specify a minimum threshold T for the distance. In this case, the operator would be defined as "less then or equals to," or just "less than." As another example, the variable property can be today's weather, the desired property is "sunny", and the operator can be "equals".

The desired property can be obtained in a variety of ways. In the example, of "when it is sunny", the desired property can be obtained directly from the words of the condition. Although a normalization function can cross-reference the term "sunny" to a particular code or character set that is the standard return value of a weather application. As another example, the desired property "home" or "work" can be cross-reference to a list specific to the receiving user (e.g., on a personal device or maintained at a server) to determine the actual location and the geo-fence around that location.

A condition can be translated into multiple logical expressions, where each one can satisfy the condition. In the example above, the location of home could also be satisfied by a connection to a home Wi-Fi network. Thus, an additional logical expression can have the variable property of current network on phone and whether the current value equals the "home network". Thus, a condition can be satisfied in multiple ways, effectively an OR as opposed to AND being required. For example, near the desk could be translated into one group of logical expressions (e.g., as above with the locations of the phone and laptop) and translated into a second group of logical expression (e.g., first user logs into laptop).

As another example, "when she wakes up" can be translated into time that alarm is set, when device is turned on that day, or when a first login occurs. This way a beep of the communication being output does not wake up the receiving person. The condition of "when she gets out of a meeting" can also be translated in various ways. In one embodiment, logical expression could be IF (Calendar Status=Free), where Calendar Status is the variable property and the desired property is Free. The calendar status could be checked periodically or at a time when the current event ends, which would catch instances where an event is added after receipt of the conditional communication.

Another example is "send me a photo when near she is at her desk." Translator 245 can translate the condition into the phone being near a laptop (e.g., as determined from network connector or if laptop is also location enabled). For example, the devices could detect each other through Bluetooth (or other Peer to Peer) or that both are on the same network.

Further translation definitions can include additional conditions. For example, "at home" can be defined to be within a geofence around the location defined as home for more than 10 minutes, or other time duration. This additional time constraint can be added for select locations. As a result, the device could track how long a user is "at home" and a notification would only get sent when the threshold time is met. Thus, a notification would not be provided when the recipient drives by home or quickly stops at home.

6. Evaluator

Evaluator 250 receives a current value of a variable property (potentially of multiple variable properties) and inserts them into the logical expression obtained from translator 245. When a current value of a variable property is received from detector 240, evaluator 250 can determine which logical expressions use the variable property, and then evaluate those identified expressions. As noted above, a variable property could be used for different conditions. In various embodiments, evaluator 250 could be part of subset 238 of application(s) that is used by detector 240 to get the current value of the variable property, or can be a system function that assesses conditions across multiple apps or all apps.

In some embodiments, once a logical expression is satisfied, triggers for the corresponding variable property can be stopped, i.e., unless there is another conditional message that uses the variable property. In other embodiments, a condition could involve multiple logical expressions and thus the entire condition may not be satisfied, even though one logical expression is satisfied. In such a case, the value of the variable property is still checked in case the value changes, which could cause a change in the result of the logical expression, thereby causing the entire condition not to be satisfied.

7. Sharing Update of Value

Some conditions can require values of variable properties of other devices. For example, the location of another device can be part of a logical expression. Another example is to check if two devices have a same ticket stored within an application. The update of the value could be done daily or weekly, and once determined a notification could be output to inform the person of the same tickets. The message can contain who has the same ticket, and the condition is that both have tickets to the same event.

As another example, a property can be whether someone has already completed a task, which may occur when a group conditional message sent out with a list of tasks (e.g., items to be obtained). Such a conditional communication could be "pick up some lemons and spinach when you are near a grocery store." Such a message could be sent to a group, and the items of lemons and spinach are two separate tasks. The logical expressions for the condition can include location as well as a status of completed for the items. The current values can be stored on a server or obtained directly from another device, e.g., when one device completes a task, a signal can be sent to other devices of the group. A user can indicate completion in a variety of ways, e.g., via a button or automatically from payment using a phone.

Once checked off, a device can send a signal to other phones and/or to a server to check off an item, which can change the value determined by the detector of another phone, and prevent the logical expression from coming up as True for that item. In one embodiment, a particular part of the conditional message could be deleted (effectively each item can be considered a different conditional message). In the above example, if spinach is completed but not lemons, then message can change from the initial content to exclude spinach. Once the items are completely met, the conditional message can be deleted. If a notification goes off and an item is not checked off, an automatic reminder could be sent (such a feature could be set by the sender and/or receiver).

C. Detector and Evaluator Handling Multiple Conditions

In some embodiments, receiving device 220 and the modules shown can track multiple conditional communications at the same time. Thus, detector 240 can detect different variable properties for different conditions, or even detect the same property for different conditions. For an example where location is used by multiple conditions, when a new conditional communication comes in, and implicates location, the new communication can be associated with the variable property of location for evaluation. And, Trigger 242 can be different for a same property when for different conditions (or can be same), and can be different for different properties.

In one embodiment, a conditional communication can be given a communication ID, with each condition linked with that communication ID. In turn, each logical expression of a particular condition can be linked with a condition ID, so that the logical expressions can be correlated to a condition, which can then be correlated to a communication. Thus, all of the logical expressions of a communication can be tracked to determine when a notification of the conditional communication should be sent.

Evaluator 250 can obtain the value of the variable property and then use the IDs to determine which logical expressions use the variable property. Each of these expressions can then be evaluated. Based on the result of the logical expression, whether all of the conditions are met can be determined, as a communication can have multiple conditions. In one embodiment, evaluator 250 can store the logical expressions, and group them by communication (e.g. all of the logical expressions for a single message can be grouped together so that it can be determined when all of the logical expression are satisfied). Also, a same logical expression could be assigned to multiple groups, and thus when its result is determined, the result can be provided to a table or other data structures that tracks all of the logical expressions associated with a particular communication.

For example, a group of logical expressions for a message can include: (1) logical expression determining whether current time is not during a scheduled event; (2) logical expression whether location has moved at least X feet from where person was at during meeting. The variable of location during meeting can be measured during scheduled event.

The output signal sent from evaluator 250 to output module 255 can indicate which communication has been satisfied (e.g., by specifying an ID), and thus a notification can be output. Output 255 can then retrieve the identified communication from communications storage 260. The notification can be the communication itself or just a reference that a communication has been received, and the user can retrieve the communication when desired.

D. Privacy

In one embodiment, a user of receiving device 220 can control privacy settings of who can send conditional communications, e.g., by maintaining a black list (forbidden people and/or devices) and/or a white list (allowed people and/or devices). Roles (e.g., in a company or as designated by a user, such as "family") can be used to set who is allowed to send conditional messages. For example, a list of friends and family can be used, and can be specified in an app, or at the system level. A digital handshake from one device to another could be used to set up a user as being allowed to send a conditional message, which could be allowed in both directions as a result of the handshake.

In one implementation, a user can also specify the application and variable properties that can be used. If the application or property is not allowed, a user error can be sent to the sending device. A list of acceptable conditions could get published to people that have been allowed to send conditional messages.

III. Server-Side

As mentioned above, the receiving device can be a server that is in communication with the sending device as well as the receiver's device. Such a server can be configured with modules that function in a similar manner as described above for FIG. 2. In various embodiments, the server can track conditional messages for many users and many devices of a same user.

A. Diagram

Figure 3:
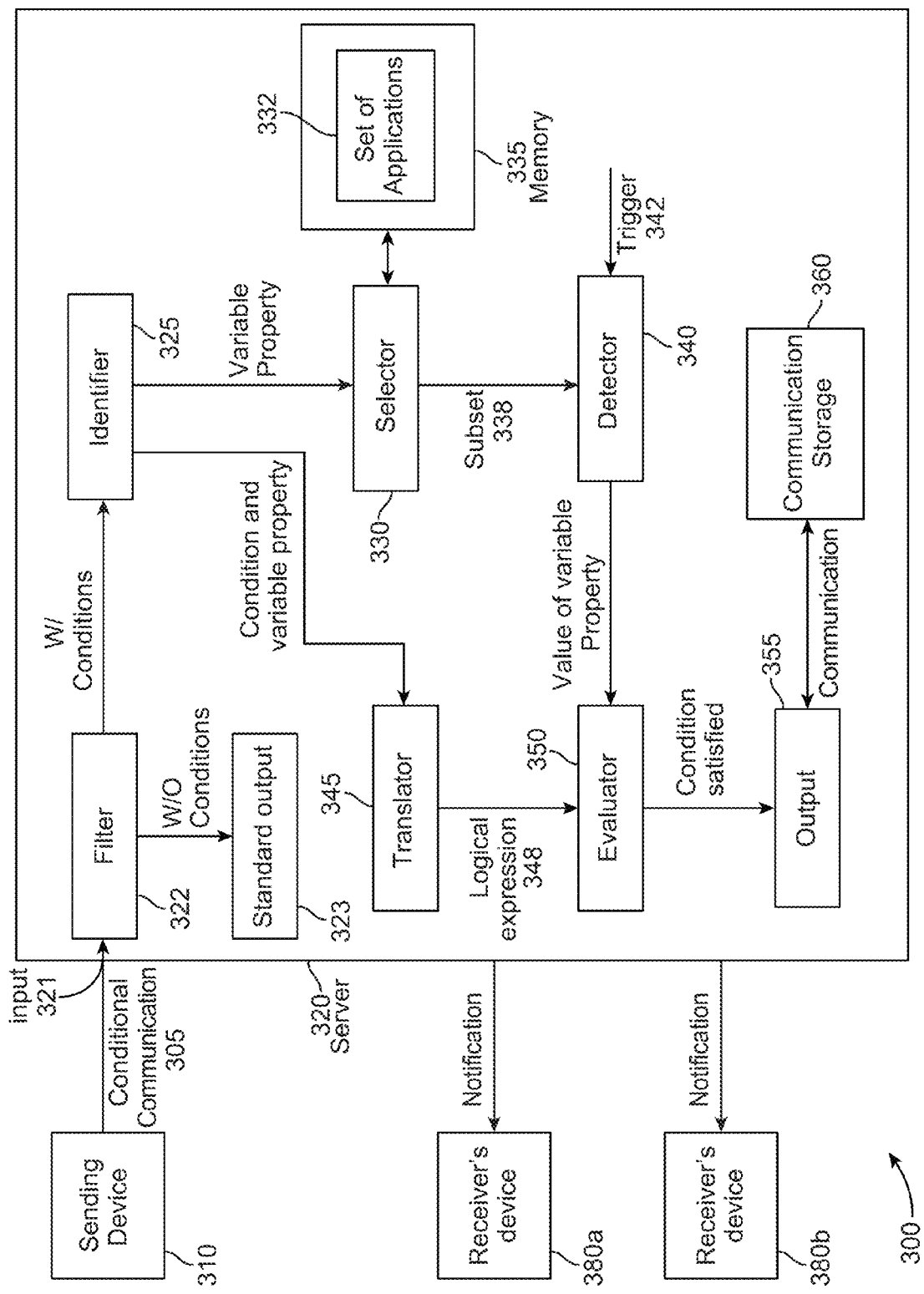
FIG. 3 shows a block diagram of a system 300 involving a server 320 configured to analyze and evaluate conditional communications according to embodiments of the present invention.

FIG. 3 shows a block diagram of a system 300 involving a server 320 configured to analyze and evaluate conditional communications according to embodiments of the present invention. Sending device 310 can receive input from a sender to define a conditional communication 305, which can be sent to server 320 via input 321. Server 320 can identify a particular sending device through a variety of mechanisms, such as an ID (e.g., a phone number or a media access control (MAC) address.

Filter 322 can operate to determine whether a communication should be sent to a standard output module or processed as a conditional communication. Standard output 323 can send the communication to a receiver's device (e.g., 380*a*) as a standard communication. Identifier 325 can identify one or more variable properties associated with the condition(s), as described above. Given that server 320 handles processing for various receiving users, server 320 can identify a recipient and use setting defined by that recipient to perform the processing. For example, a recipient could define which variable properties are associated with which condition, and server 320 can store the settings for each recipient.

Selector 330 can select a subset 338 of one or more application from set 332 stored in memory 335. The set 332 of applications can be specific to the recipient or be any application available to any user. Trigger 342 can be set at the server-level (i.e. be the same for each variable property) or be different based on the recipient. Detector 340 can contact a particular receiver's device 380*a* and 380*b* to obtain current values of the variable property, if needed. Detector 340 can also obtain the current value from other servers and devices, if needed.

Translator 345 can translate conditions depending on a recipient, and can track conditions and logical expressions 348 across conditional communications. Evaluator 350 can evaluate logical expressions for any condition for the conditional communications that have been received at server 300. The satisfied signal to output 355 can specify a global ID for the conditional communication, which can be retrieved from communication storage. Note that the specific communication sent may vary depending on the recipient.

B. Coordinating Devices

A receiving person can be associated with multiple devices, which can define the user's context. Server 320 can track the different user devices of a recipient, and send a notification of a communication to specific subset of the devices or vary the notification depending on the device. In one implementation, the specific subset can be determined based on capabilities of the devices (e.g., whether a device can accept or display a particular communication or notification thereof). In another implementation, the specific subset can also be determined based on the conditions associated with the communication. For instance, a condition can depend on a variable property that is only applicable to devices that have certain capabilities. For example, a condition could depend on when a video has been watched, and thus the subset of devices would be ones that can play video, as those devices can be used to determine when the condition is met. As another example, the subset of devices could devices that have location detection capabilities. Thus, server 320 can receive a conditional communication associated with a particular person (e.g., by an ID, such as a phone number) and then determine devices associated with that person to which to output a notification.

In one embodiment, server 320 can process the conditional communication to determine the condition and the appropriate subset of the receiver's devices should receive the conditional message, and then send the conditional communication such that each device of the subset determines when the condition is met. The conditional communication can modify or tailor the condition to be specific to a device (e.g., an identifier of an application specific to a device can be sent for the device to use in obtaining a current value of a variable property or determine different logical expressions for each device of the subset). The conditional communication could be formulated in way that is specific to the device (i.e. phone can get one conditional communication and laptop get a different conditional communication). Thus, evaluator 350 and detector 340 can be on the receiver's device, while other modules can reside on server 320. In another embodiment, server 320 can determine when the condition is met, and then sent the conditional communication to appropriate devices.

The appropriate devices can be determined by determining the applications (which can relate to the functionality of the device) available on each specific device. For example, whether the device can determine its location or has a calendar function can be used to determine if that device is appropriate for sending a conditional communication or notification thereof. Other functions include whether a device can play music or a video, which may be relevant if the condition relates to ending a particular media file.

For instance, if the conditional communication is to send a message when done watching a particular show (e.g., "what did you think about that surprise ending?"), server 320 can determine when the show is watched on any one of the devices associated with the person (e.g., a tablet) and then the message can be sent. Server 320 could probe the devices, e.g., by sending a request to the device to determine if the show has been played. If the show has been played (current value of property), then the message can be sent.

Accordingly, in some embodiments, a method provides a notification of a conditional communication to a subset of devices associated with a first user. Besides determining a subset of one or more of the electronic devices based on one or more capabilities of the electronic devices, the subset can be determined based on identifying devices associated with the variables property. The subset of devices can also be further determined based on whether a capability of determining the variable property is within the one or more capabilities of each of the subset of devices.

IV. Method

Figure 4:
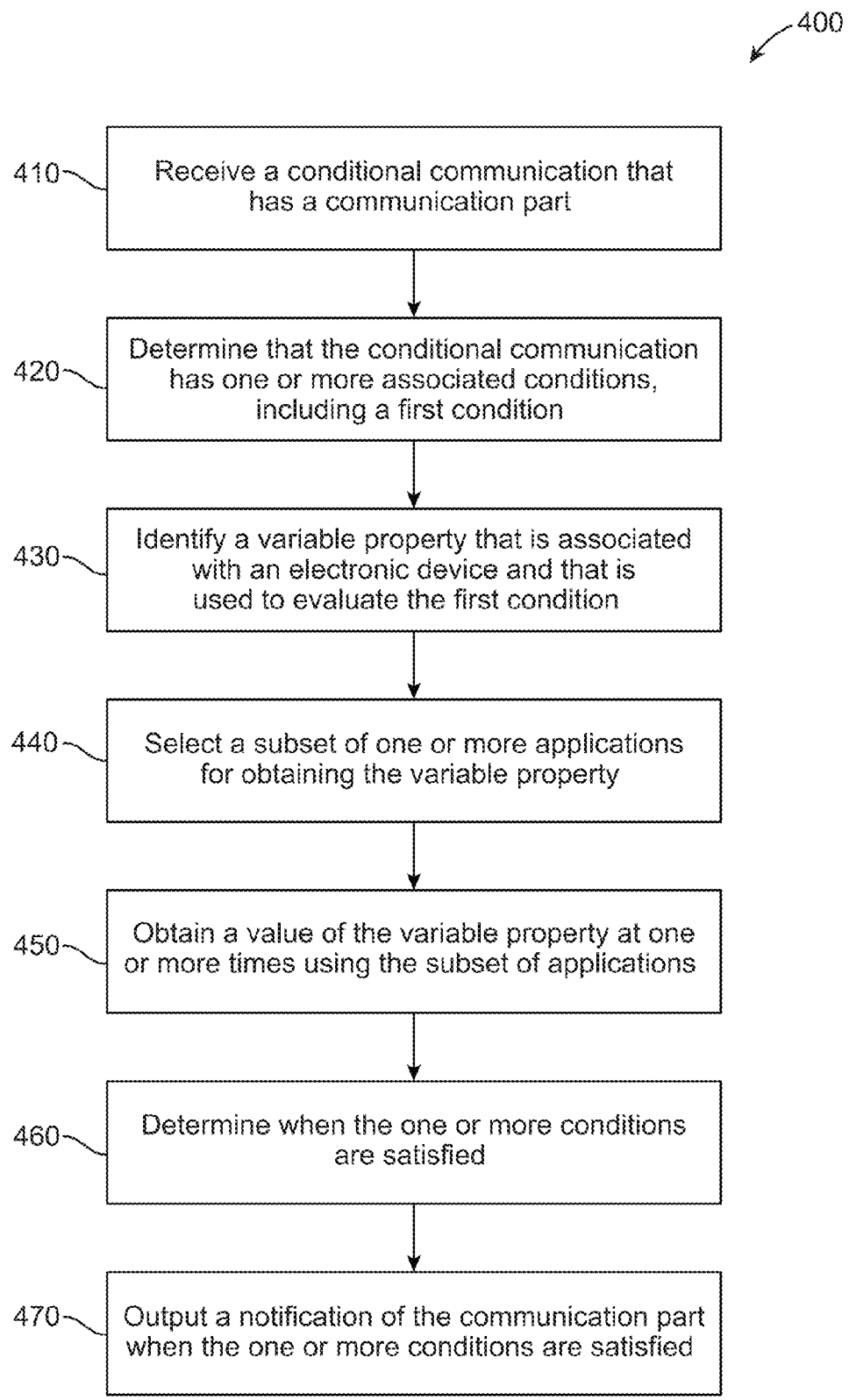
FIG. 4 is a flowchart of a method 400 for providing a notification of a conditional communication according to embodiments of the present invention.

FIG. 4 is a flowchart of a method 400 for providing a notification of a conditional communication according to embodiments of the present invention. Method 400 can be performed by a server or by a recipient's device. For example, method 400 may be performed by receiving device 220 or server 320. Some or all of the steps of method 400 can be performed by modules in FIG. 2 and/or FIG. 3.

At block 410, a conditional communication is received. The conditional communication can include one or more conditions, an instruction part, and a communication part. The conditional communication can be received at an network interface of a computer system, which may be the server or a recipient's device.

At block 420, the computer system determines that the conditional communication has one or more associated conditions, including a first condition. The one or more conditions can be determined as described herein. For example, the words of the conditional communication can be parsed to identify conditional language, or a code can specify that the communication is conditional.

At block 430, the computer system identifies a variable property that is associated with an electronic device and that is used to evaluate the first condition. The electronic device may be the computer system or a different device. As described above, a set of applications are installed on the electronic device. The applications may or may not be actively executing on the electronic device.

In one embodiment, the variable property is identified by using an identifier in the conditional communication (e.g., the conditional communication can contain a code that indicates a type of condition and/or the property on which the condition is based). The identifier can specify the variable property directly (e.g., by name) or require a lookup in a table to identify the variable property.

At block 440, the computer system selects a subset of one or more applications from the set for obtaining the variable property associated with the electronic device. The subset can vary depending on the variable property. The subset may be selected in various ways, e.g., as described herein. For example, a word search for the variable property can be performed in summaries, code, or output of the applications to determine the ability to return a value of the variable property.

In one embodiment, an identifier of the variable property is used to access one or more data structures to select the subset of applications corresponding to the identifier. For example, the computer system can store a table, with each row corresponding to a different variable property (i.e. identifier). The rows can be of variable length, with varying number of applications capable of or needed to obtain a current value of the variable property. If apps are interchangeable, other criteria can be used, such as preferences entered by a user of the computer system.

At block 450, the computer system obtains a value of the variable property at one or more times using the subset of applications. For example, a detector module can receive a trigger, and in response, detect the variable property. The subset of applications can in turn invoke any hardware at the electronic device or external to the electronic device, or invoke other applications at the electronic device or external to the electronic device.

At block 460, the computer system determines when the one or more conditions are satisfied, including determining when the variable property satisfies the first condition. For example, an evaluator module can insert the value of the variable property to evaluate one or more logical expressions (e.g., as determined by a translator module) that comprise the first condition. Any other conditions can be determined in a similar fashion using other variable properties. An identifier can be used to determine the logical expressions containing the variable property, e.g., the identifier can be used to cross-reference a table or the logical expressions can be searched directly. The identifier can also be used to determine where to insert the value into the logical expression.

At block 470, when the one or more conditions are satisfied, a notification of the communication part is output. In one embodiment, the notification contains the communication part of the conditional communication. In another embodiment, the notification is an alert that the conditional communication has been received and is awaiting review.

Some embodiments can use an ID to track when the conditions of a particular conditional communication are satisfied. For example, an ID can be assigned to the conditional communication (e.g., by the electronic device or potentially by a sending device), which can be stored associated with the ID. The one or more associated conditions can be linked to the ID (e.g., the ID can be added to a data object that defines the condition). When the one or more conditions are satisfied, the ID can be used to determine which communication part to send the notification.

When the computer system is a server, a first user can be associated with a plurality of electronic devices. The server can analyze the conditional communication (e.g., after the variable property is identified) to determine which one or more of the electronic devices require obtaining information for determining when the one or more conditions are satisfied. The information may be a value of the variable property, which may be associated with the one or more electronic devices. The value can be obtained from each of the one or more electronic devices using the subset of applications. In various implementations, any or all of the values can be used to determine when the one or more conditions are satisfied.

A. Delivery of Communication

In some embodiments, a communication can be delivered automatically, but an alert (a type of notification) can be sent only when the associated condition(s) are satisfied. For example, a conditional e-mail can be delivered to a user's inbox, but an alert is not delivered until the conditions are satisfied. Thus, the delivery of the communication part can be independent of the output of the notification. In one embodiment, the notification is an alert that the conditional communication has been received and is awaiting review. In this manner, the user can still find the e-mail in the inbox if she is looking in the inbox, but would not get distracted by an alert if she were performing other tasks, at least not until the condition(s) were satisfied.

The notification can be that message is available on another device (e.g. notification phone that message is on laptop) or message is available on e-mail, which can be accessible from multiple devices. If on laptop, the message could be more specific, such as actually presenting the message. Thus, the conditional message could be formulated in way that is specific to the device (i.e. phone can get one conditional message and laptop get a different conditional message). Therefore, the communication part can be transmitted to a first application so that the communication part is viewable by a user regardless of any conditions, with the notification being an alert that the conditional communication has been received and is awaiting review by the user. The first application could be running on the user device that outputs the notification, or on a different device, e.g., a different device of the user or a server.

B. Forms of Communication

As mentioned above, a communication can be a message of words to be provided to a user, but can also various types of signals. In one embodiment, the communication can also be an instruction to perform an action, e.g., play music. Thus, the notification of the communication part does not need to be the exact words specified by the sender, but can be a result of the instructions sent by the sender; the communication part can specify which song to play. For example, a conditional communication could be: if two devices are in proximity, then play a particular song; or when I get near this location, play a song.

The notification can be output can be to a different application. For example, the notification can be a command to a different application, e.g., open up a particular folder of photos. The command can be considered a communication that is sent to a destination application, which interprets the command. As an example, the photos could be of a particular location, which the user is at or near. Thus, the conditional communication could cause certain photos (which may already be on the user's device) to automatically open up when the user is at a location (or cause the photos to be displayed first when a folder is opened). The photos could be tagged with the location, thereby allowing the photos to determined, along with facial recognition of the receiver once the receivers face has been identified.

As another example, the communication could be an output that is provided to another device. For example, the condition could be that the first device is near another device (e.g., friend's phone), which can ensure that two people enter to an event together. If the first device gets a request from an authorization device (e.g., as used by a gate attendant), then the output is provided from the phone. If the friend is not near, then the output is not provided and access would not be given.

V. Dynamic Content

In some embodiments, the notification of the communication (e.g., the message sent) can depend on how the condition(s) is satisfied. The conditions can be satisfied in different ways, such as what the current value of the variable property is or from where the current value was obtained (e.g., which device). For example, a conditional communication can involve a condition of when two friends are in proximity to each then a message is sent to both. The content of the message can vary depending on who the two friends are. For instance, a server can determine if the two devices of the friends are close to each other, and can send information about the other person, e.g., profile from a social networking site.

Figure 5:
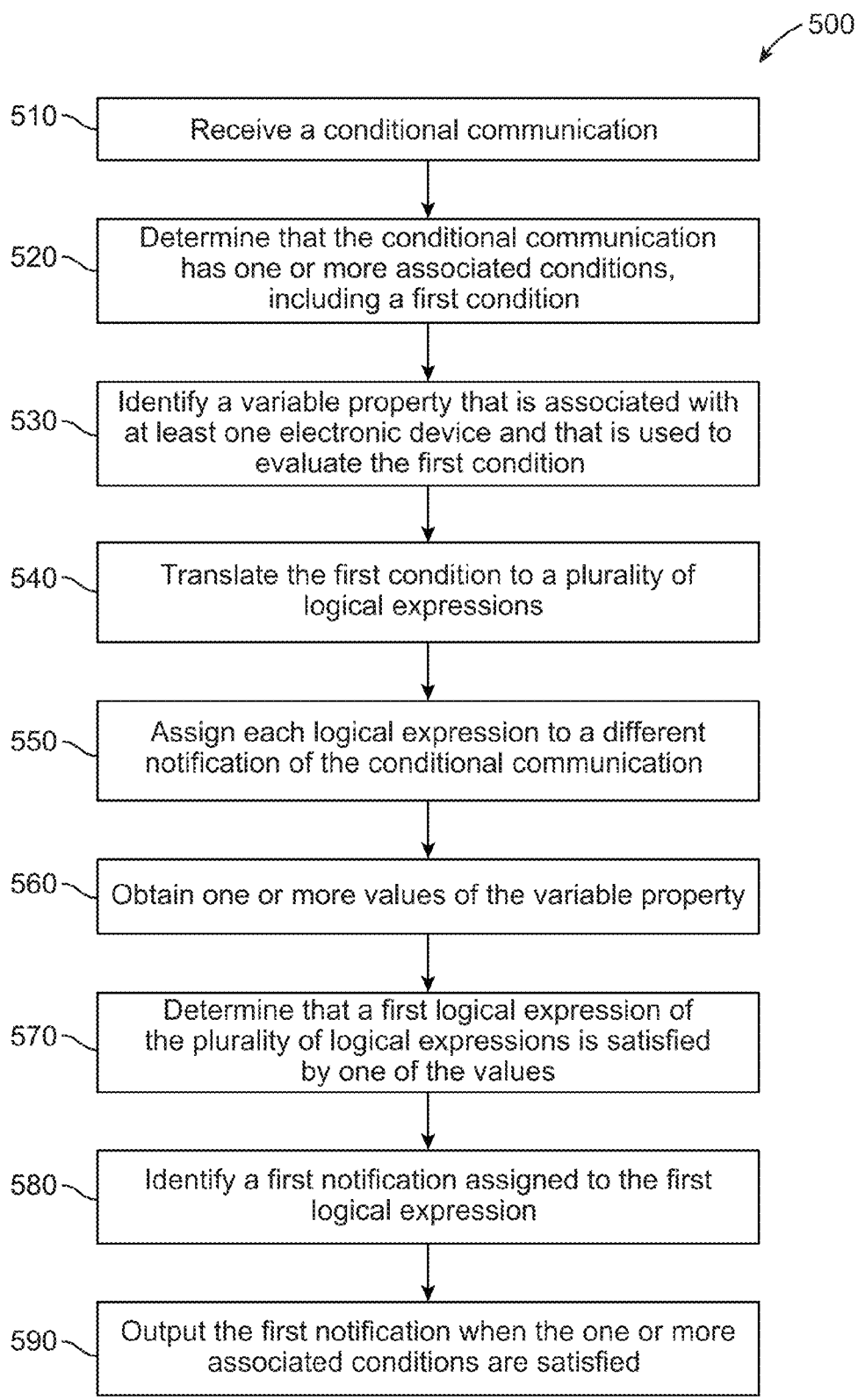
FIG. 5 is a flowchart of a method for providing a notification of a conditional communication according to embodiments of the present invention.

FIG. 5 is a flowchart of a method 500 for providing a notification of a conditional communication according to embodiments of the present invention. Method 500 can be implemented by various modules in FIG. 2 and/or FIG. 3. Details of techniques provided herein may also be applied to method 500.

At block 510, a conditional communication is received. The conditional communication can be sent from a sending device (e.g., 210 or 310) to a receiving device (e.g., 220) or a server (e.g., 320). Receiving device 220 and server 320 are examples of computer systems that can perform some or all of the steps of method 500.

At block 520, a computer system determines that the conditional communication has one or more associated conditions, which include a first condition. The condition(s) can be determined in any manner described herein or other suitable manner. For example, the computer system can analyze words in the conditional communication or an identifier that can be used to cross-reference a data structure (e.g., a table) to determine the associated condition(s).

At block 530, the computer system identifies a variable property that is associated with at least one electronic device and that is used to evaluate the first condition. For example, the variable property can be associated with a recipient's device, which may or may not be the computer system. The variable property can be associated with other devices, e.g., when the conditional communication is sent to multiple recipients.

At block 540, the computer system translates the first condition to a plurality of logical expressions. In an example where there are multiple recipient devices, the first condition can be translated to a logical expression for each recipient device. All of the recipient devices may be associated with a single person (e.g., a phone, table, and laptop computer of a person) or each associated with a different person (e.g., a phone of each person). In an example where there are multiple locations that can satisfy the first condition, each location can be represented by a separate logical expression. For instance, a different logical expression can exist depending on the brand of grocery store that a device is near.

At block 550, the computer system assigns each logical expression to a different notification of the conditional communication The different notification have different content. In the example of different locations of grocery stores, the notification could have a first content for a first brand of grocery store and a second content for a second brand of grocery store. As another example, a different logical expression can exist for each possible pair of a group of devices (e.g., different friends), and a different message can exist for each pair of friends. For instance, the introduction can change depending on who the people are.

In one embodiment, the content of the notification can vary based on which device the conditional message is going to. As mentioned above, a same conditional message could be sent to multiple devices, with each device getting different content in the notification (e.g., one just mentioning that item exists, and the other device actually displaying the sent content).

At block 560, the computer system obtains one or more values of the variable property. In an example where the conditional communication has multiple recipient devices, a value can be obtained for each recipient device. In another example, one value of a variable property (e.g., location or a local weather) can be obtained, where the one value is inserted into a corresponding logical expression.

At block 570, the computer system determines that a first logical expression of the plurality of logical expressions is satisfied by one of the values. In one embodiment, the value is used within a specific logical expression. For example, when the value is obtained from a specific one of a plurality of recipient devices, the value can be inserted into a specific logical expression corresponding to the recipient device. In another embodiment, the value can be used in a plurality of logical expressions until one of the logical expressions is satisfied. Each logical expression would have a different desired value of the property, and the one value would correspond to the desired value of the first logical expression.

In one embodiment, the at least one electronic device is associated with a first user, where the first user is associated with a plurality of devices. The computer system can determine which one or more of the electronic devices are associated with the variable property, and obtain a value of the variable property for each of the one or more electronic devices. The one or more values of the variable property can be used to determine whether the first condition is satisfied At block 580, the computer system identifies a first notification assigned to the first logical expression. When the first logical expression is determined, a table or other data structure can be used to cross-reference the corresponding notification. For example, the first logical expression can be associated with a particular device, and a device ID or ID for the logical expression can be used to retrieve the corresponding notification from memory. Each logical expression can correspond to a different electronic device. Thus, the at least one electronic device can include a first device of a first user and a second device of a second user, and the first notification can be associated with the first device and a second notification is associated with the second device.

At block 590, the first notification is output when the one or more associated conditions are satisfied. For example, the first notification can be output (e.g., from a server) to a recipient's device that corresponds to the first notification. As another example, the notification corresponding to the current location is output from a receiving device, when the receiving device determines that the current location satisfies the first logical expression.

The exact notification to be output can depend on various sets of logical expressions. For example, the notification can depend on which two friends are within proximity of each, as may be determined by a geo-fence (a first set being associated with the combinations of pairs of friends). However, the notification can be further dependent on the actual location where the two friends (i.e., their personal devices) is at. This second set is dependent on an actual location. Either set can be viewed as the plurality of logical expressions. For example, if the same two people are close, but far from "home", then the message can be different than when the same two people are within proximity of each other, but the location is "work".

In some embodiments, the notification can be the communication itself. The communication can vary as described herein. For example, the communication can be that the receiver gets a ticket, but which ticket is dependent on a device that the receiver's device is in proximity.

VI. Mobile Device and Server

FIG. 6A is a simplified block diagram of an implementation of a receiver's device 600 according to an embodiment of the present invention. Device 600 can be a mobile device, a handheld device, a notebook computer, a desktop computer, or any suitable electronic device with a screen for displaying images and that is capable of communicating with a server 650 as described herein. Device 600 includes a processing subsystem 602, a storage subsystem 604, a user input device 606, a user output device 608, a network interface 610, and a location/motion detector 612.

Processing subsystem 602, which can be implemented as one or more integrated circuits (e.g., e.g., one or more single-core or multi-core microprocessors or microcontrollers), can control the operation of device 600. In various embodiments, processing subsystem 602 can execute a variety of programs in response to program code and can maintain multiple concurrently executing programs or processes. At any given time, some or all of the program code to be executed can be resident in processing subsystem 602 and/or in storage subsystem 604.

Through suitable programming, processing subsystem 602 can provide various functionality for device 600. For example, processing subsystem 602 can execute a set of application programs (or "apps") 616 and condition-aware modules 617. Condition-aware modules 617 can perform all or parts of methods described herein, such as determining a condition of a conditional communication, an associated variable property, a subset of apps for determining values of the variable property, and evaluating logical expressions involving the variable property. Communications can be stored in communication storage 618 until a condition is met for outputting a notification of the communication.

Storage subsystem 604 can be implemented, e.g., using disk, flash memory, or any other storage media in any combination, and can include volatile and/or non-volatile storage as desired. In some embodiments, storage subsystem 604 can store one or more application programs to be executed by processing subsystem 602 (e.g., apps 616 and modules 617). In some embodiments, storage subsystem 604 can store other data, such as data structures containing identifiers for cross-referencing various data objects described herein (such a logical expressions, variable properties, etc.). Programs and/or data can be stored in non-volatile storage and copied in whole or in part to volatile working memory during program execution.

A user interface can be provided by one or more user input devices 606 and one or more user output devices 608. User input devices 606 can include a touch pad, touch screen, scroll wheel, click wheel, dial, button, switch, keypad, microphone, or the like. User output devices 608 can include a video screen, indicator lights, speakers, headphone jacks, or the like, together with supporting electronics (e.g., digital-to-analog or analog-to-digital converters, signal processors, or the like). A customer can operate input devices 606 to invoke the functionality of device 600 and can view and/or hear output from device 600 via output devices 608.

Network interface 610 can provide voice and/or data communication capability for device 600. For example, network interface 610 can provide device 600 with the capability of communicating with server 650. In some embodiments network interface 610 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 610 can provide wired network connectivity (e.g., Ethernet) in addition to or instead of a wireless interface. Network interface 610 can be implemented using a combination of hardware (e.g., antennas, modulators/demodulators, encoders/decoders, and other analog and/or digital signal processing circuits) and software components.

Location/motion detector 612 can detect a past, current or future location of device 600 and/or a past, current or future motion of device 600. For example, location/motion detector 612 can detect a velocity or acceleration of mobile electronic device 600. Location/motion detector 612 can comprise a Global Positioning Satellite (GPS) receiver and/or an accelerometer. In some instances, processing subsystem 602 determines a motion characteristic of device 600 (e.g., velocity) based on data collected by location/motion detector 612. For example, a velocity can be estimated by determining a distance between two detected locations and dividing the distance by a time difference between the detections.

FIG. 6B is a simplified block diagram of an implementation of a server 650 according to an embodiment of the present invention. Server 650 may simply receive and forward a conditional communication, determine which device to forward a conditional communication, and/or analyze the conditional communication to determine how and when it is satisfied. Server 650 includes a processing subsystem 652, storage subsystem 654, a user input device 656, a user output device 658, and a network interface 660. Network interface 660 can have similar or identical features as network interface 610 of device 600 described above.

Processing subsystem 652, which can be implemented as one or more integrated circuits (e.g., a conventional microprocessor or microcontroller), can control the operation of server 650. In various embodiments, processing subsystem 652 can execute a variety of programs in response to program code and can maintain multiple concurrently executing programs or processes. At any given time, some or all of the program code to be executed can be resident in processing subsystem 652 and/or in storage subsystem 654.

Through suitable programming, processing subsystem 652 can provide various functionality for server 650. Thus, server 650 can interact with apps 616 and modules 617 being executed on device 600 in order to provide notifications of conditional communications to device 600. Server can also perform same or similar functionality as device 600 using a set of apps 666, condition-aware modules 667, and communication storage 668.

Storage subsystem 654 can be implemented, e.g., using disk, flash memory, or any other storage media in any combination, and can include volatile and/or non-volatile storage as desired. In some embodiments, storage subsystem 654 can store one or more application programs to be executed by processing subsystem 652. In some embodiments, storage subsystem 654 can store other data, such as data structures containing identifiers for cross-referencing various data objects described herein (such a logical expressions, variable properties, etc.). Programs and/or data can be stored in non-volatile storage and copied in whole or in part to volatile working memory during program execution.

A user interface can be provided by one or more user input devices 656 and one or more user output devices 658. User input and output devices 656 and 658 can be similar or identical to user input and output devices 606 and 608 of device 600 described above. In some instances, user input and output devices 656 and 658 are configured to allow a programmer to interact with server 650. In some instances, server 650 can be implemented at a server farm, and the user interface need not be local to the servers.

It will be appreciated that device 600 and server 650 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 600 and/or multiple servers 650, different devices 600 and/or servers 650 can have different sets of capabilities; the various devices 600 and/or servers 650 can be but need not be similar or identical to each other.

Further, while device 600 and server 650 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 600 and server 650 are described as singular entities, it is to be understood that each can include multiple coupled entities. For example, server 650 can include, a server, a set of coupled servers, a computer and/or a set of coupled computers.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. An electronic device associated with a first user, wherein a set of applications are installed on the electronic device, the electronic device comprising:
   an input for receiving a conditional communication that has a communication part; and
   a processor configured to:
      determine that the conditional communication has one or more associated conditions, including a first condition;
      identify a variable property that is associated with the electronic device and that is used to evaluate the first condition;
      select a subset of one or more applications from the set for obtaining the variable property associated with the electronic device, the one or more applications in the subset being dependent on the identified variable property;
      obtain a value of the variable property at one or more times using the subset of applications;
      determine whether the one or more conditions are satisfied, including determining whether the variable property satisfies the first condition; and
      when the one or more conditions are satisfied, output a notification of the communication part.

2. The electronic device of claim 1, wherein the processor is configured to:
   provide user configuration of users allowed to submit conditional communications to the electronic device;
   determine a sender of the conditional communication;
   if the sender is allowed to submit conditional communications to the electronic device, proceeding to analyze the conditional communication to determine whether the one or more conditions are satisfied; and
   if the sender is not allowed to submit conditional communications to the electronic device, not proceeding to analyze the conditional communication to determine whether the one or more conditions are satisfied.

3. The electronic device of claim 1, wherein the electronic device is configured to output the notification via audio or visually on a display of the electronic device.

4. The electronic device of claim 1, wherein the processor is configured to:
   obtain the variable property at one or more times using the subset of applications in response to a trigger.

5. The electronic device of claim 4, wherein the trigger is a signal received at an input of the electronic device from a user or from another device.

6. The electronic device of claim 4, wherein the trigger is programmable by a user of the electronic device.

7. The electronic device of claim 1, wherein the first condition is a string of words, wherein the processor is further configured to:
   translate the first condition to one or more logical expressions that use a value of the variable property.

8. The electronic device of claim 7, wherein the first condition is that the first user is at a home, and wherein the processor is configured to:
   translate home to a first location using a definition stored in the electronic device; and
   determine whether the first user is at home by comparing a detected location of the electronic device and the first location.

9. The electronic device of claim 1, wherein the processor is configured to:
assign an ID to the conditional communication;
store the communication part in a storage, the storage containing communication parts of other conditional communications;
link the one or more associated conditions to the ID; and
when the one or more conditions are satisfied, use the ID to determine which communication part to send the notification.

10. The electronic device of claim 1, wherein the notification contains the communication part of the conditional communication.

11. The electronic device of claim 1, wherein the notification is an alert that the conditional communication has been received and is awaiting review.

12. The electronic device of claim 1, wherein the electronic device includes a server that is communication with a portable computer of the first user.

13. A method for providing a notification of a conditional communication, the method comprising:
receiving a conditional communication that has a communication part;
determining, with a computer system, that the conditional communication has one or more associated conditions, including a first condition;
identifying, with the computer system, a variable property that is associated with an electronic device and that is used to evaluate the first condition, wherein a set of applications are installed on the electronic device;
selecting, with the computer system, a subset of one or more applications from the set for obtaining the variable property associated with the electronic device, the one or more applications in the subset being dependent on the identified variable property;
obtaining, with the computer system, a value of the variable property at one or more times using the subset of applications;
determining, with the computer system, whether the one or more conditions are satisfied, including determining whether the variable property satisfies the first condition; and
when the one or more conditions are satisfied, output a notification of the communication part.

14. The method of claim 13, wherein the electronic device is of a first user, wherein the computer system is the electronic device, and wherein the conditional communication is received from a second device of a second user.

15. The method of claim 13, wherein identifying the variable property includes:
using an identifier in the conditional communication, the identifier specifying the variable property, wherein the identifier is used to access one or more data structures to select the subset of applications corresponding to the identifier.

16. The method of claim 15, further comprising:
sending the identifier along with the value of the variable property to an evaluator;
using the identifier to determine where in a logical expression the value is to be inserted to evaluate the first condition.

17. The method of claim 13, further comprising:
assigning an ID to the conditional communication;
storing the communication part in a storage, the storage containing communication parts of other conditional communications;
linking the one or more associated conditions to the ID; and
when the one or more conditions are satisfied, using the ID to determine which communication part to send the notification.

18. The method of claim 13, wherein the electronic device is of a first user, and wherein the first user is associated with a plurality of electronic devices, the method further comprising:
determining which one or more of the electronic devices require obtaining information for determining whether the one or more conditions are satisfied, the variable property being associated with the one or more electronic devices;
obtaining, with the computer system, the value of the variable property at one or more times using the subset of applications for each of the one or more electronic devices;
using the one or more values of the variable property to determine whether the one or more conditions are satisfied.

19. The method of claim 13, further comprising:
transmitting the communication part to a first application so that the communication part is viewable by a user regardless of any conditions, wherein the notification is an alert that the conditional communication has been received and is awaiting review by the user.

20. The method of claim 13, wherein the computer system is a server, and wherein the electronic device is of a first user, the method further comprising:
identifying a plurality of devices of the first user;
determining a subset of one or more of the devices;
outputting the notification to the subset of devices, the subset including the electronic device, wherein the subset of devices is determined based on one or more capabilities of the devices.

21. A computer product comprising a non-transitory computer readable medium storing a plurality of instructions that when executed control a computer system to provide a notification of a conditional communication, the instructions comprising:
receiving a conditional communication that has a communication part;
determining that the conditional communication has one or more associated conditions, including a first condition;
identifying a variable property that is associated with an electronic device and that is used to evaluate the first condition, wherein a set of applications are installed on the electronic device;
selecting a subset of one or more applications from the set for obtaining the variable property associated with the electronic device, the one or more applications in the subset being dependent on the identified variable property;
obtaining a value of the variable property at one or more times using the subset of applications;
determining whether the one or more conditions are satisfied, including determining whether the variable property satisfies the first condition; and
when the one or more conditions are satisfied, output a notification of the communication part.

22. A method for providing a notification of a conditional communication, the method comprising:
receiving a conditional communication;
determining, with a computer system, that the conditional communication has one or more associated conditions, including a first condition;

identifying, with the computer system, a variable property that is associated with at least one electronic device and that is used to evaluate the first condition;

translating, with the computer system, the first condition to a plurality of logical expressions;

assigning each logical expression to a different notification of the conditional communication, wherein different notifications have different content;

obtaining, with the computer system, one or more values of the variable property;

determining, with the computer system, that a first logical expression of the plurality of logical expressions is satisfied by one of the values;

identifying, with the computer system, a first notification assigned to the first logical expression; and output the first notification when the one or more associated conditions are satisfied.

23. The method of claim 22, wherein the at least one electronic device includes a first device of a first user and a second device of a second user, and wherein the first notification is associated with the first device and a second notification is associated with the second device.

24. The method of claim 22, wherein the at least one electronic device includes a first device of a first user, wherein each logical expression uses a different desired value for the variable property, and wherein the one of the values corresponds to the desired value of the first logical expression.

25. The method of claim 22, wherein the at least one electronic device is associated with a first user, the first user being associated with a plurality of devices, the method further comprising:

determining which one or more of the electronic devices are associated with the variable property;

obtaining a value of the variable property for each of the one or more electronic devices; and using the one or more values of the variable property to determine whether the first condition is satisfied.

26. The method of claim 25, wherein each logical expression corresponds to a different electronic device.

* * * * *